Nov. 3, 1970  D. W. HILTERBRICK ET AL  3,538,361
ALTERNATOR WITH BI-DIRECTIONAL COOLING MEANS
Filed Aug. 9, 1968  5 Sheets-Sheet 1

INVENTORS.
DONN W. HILTERBRICK
CLARENCE A. HAUT
CHESTER C. QUANTZ
BY
D Henry Stoltenberg
ATTORNEY Nov. 3, 1970     D. W. HILTERBRICK ET AL     3,538,361
ALTERNATIVE WITH BI-DIRECTIONAL COOLING MEANS
Filed Aug. 9, 1968     5 Sheets-Sheet 3

INVENTORS.
DONN W. HILTERBRICK
CLARENCE A. HAUT
CHESTER C. QUANTZ
BY
ATTORNEY

Nov. 3, 1970  D. W. HILTERBRICK ET AL  3,538,361
ALTERNATOR WITH BI-DIRECTIONAL COOLING MEANS
Filed Aug. 9, 1968  5 Sheets-Sheet 4
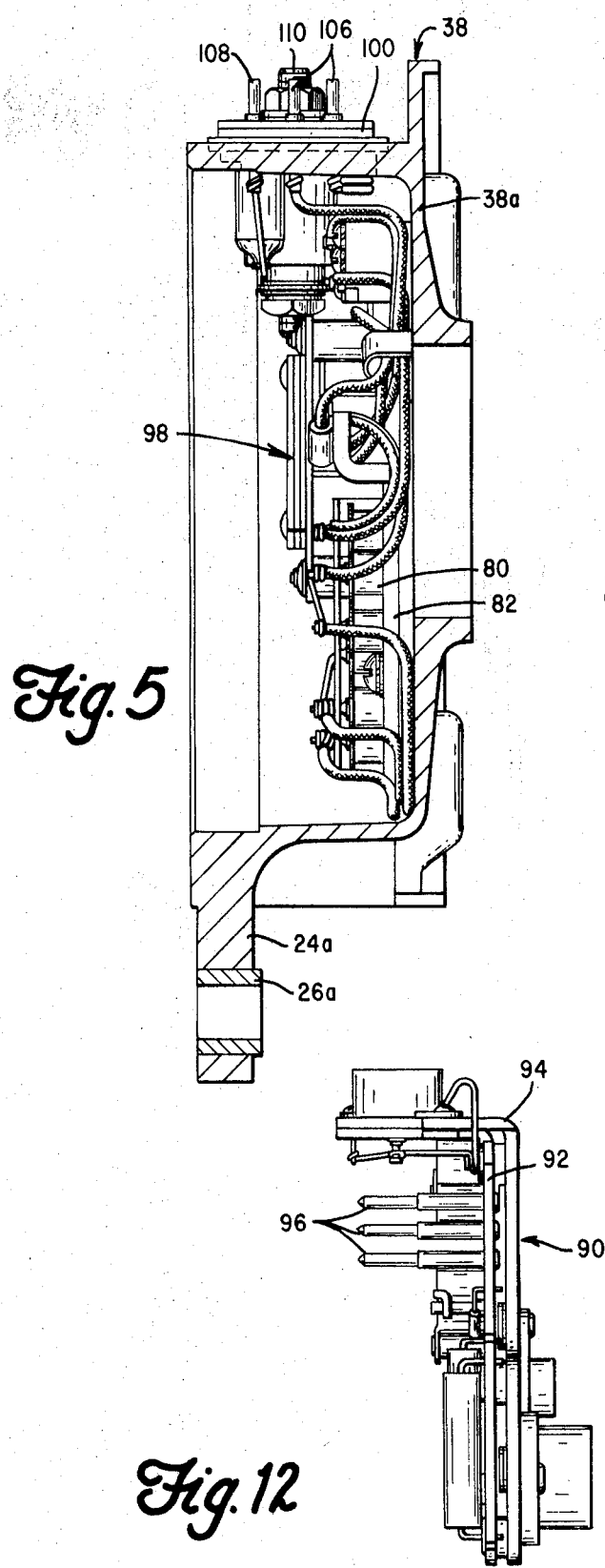
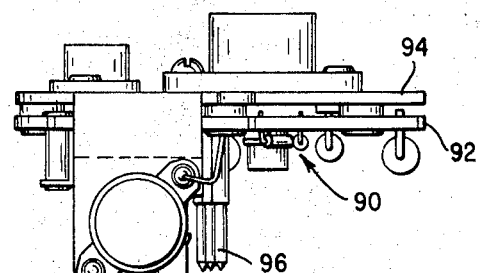
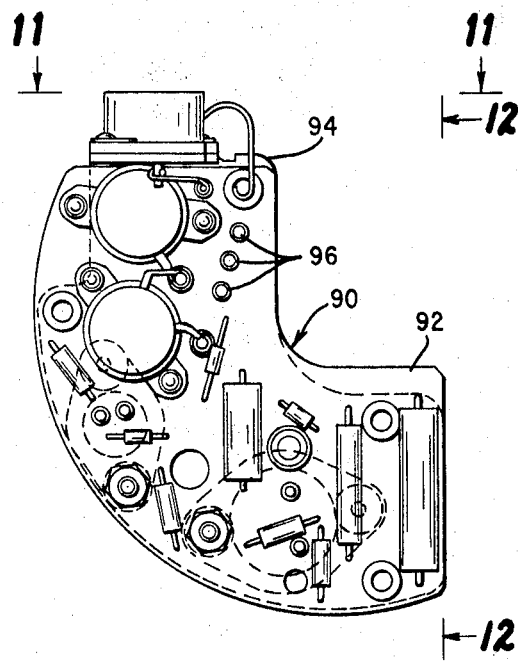
INVENTORS.
DONN W. HILTERBRICK
CLARENCE A. HAUT
CHESTER C. QUANTZ
BY
ATTORNEY United States Patent Office 3,538,361
Patented Nov. 3, 1970

3,538,361
ALTERNATOR WITH BI-DIRECTIONAL
COOLING MEANS
Donn W. Hilterbrick, Clarence A. Haut, and Chester C.
Quantz, Bay City, Mich., assignors to Eltra Corporation, Toledo, Ohio
Filed Aug. 9, 1968, Ser. No. 751,584
Int. Cl. H02k 11/00
U.S. Cl. 310—68   7 Claims

ABSTRACT OF THE DISCLOSURE

A dynamo-electric machine, more particularly an alternator for use with automotive vehicles for providing direct-current electric power for charging batteries and the like. The subject device includes rectifiers for converting three phase alternating current to direct current and static regulating devices for controlling the output are mounted in the alternator to provide a power supply system adapted to be mounted in the automotive vehicle or the like to be connected into its electrical circuits.

---

Alternators are being used in automotive vehicles to improve the performance of their electrical components, particularly at the lower speeds of operation of the vehicles and also at idling, and it is highly desirable to provide a more efficient source of direct-current power which will improve performance under these conditions.

It is therefore a principal object of this invention to provide an alternator for use with automotive vehicles and marine applications which is more efficient and will provide the desired power output at low operating speeds so that the batteries used in these applications will be maintained at a high state of charge.

It is a further object of this invention to provide a unitary construction for an alternator wherein the regulating controls of solid state devices are incorporated into the body of the alternator and provided with efficient cooling devices to operate within acceptable temperature ranges at full power output.

It is a further object of this invention to provide an alternator with integral regulating controls which is provided with an efficient cooling system having separate air flow patterns for the cooling of the magnetic portions from that air flow cooling the regulating controls.

Other objects and advantages of this invention relating to the arrangement, operation and function of the related elements of the structure, to various details of construction, to combinations of parts and to economies of manufacture will be apparent to those skilled in the art upon consideration of the following description and appended claims, reference being had to the accompanying drawings forming a part of this specification wherein like reference characters designate corresponding parts in the several views.

FIG. 2 is an elevational end view of the alternator shown in FIG. 1 from the left side;

FIG. 3 is an elevational end view from the drive end;

FIG. 4 is a cross-sectional view partly in section of the device;

FIG. 5 is a cross-sectional view of one of the casing elements of the alternator;

FIG. 6 is an elevational view partly cut away of a fan element;

FIG. 7 is an elevational view taken along the line 7—7 of FIG. 6;

FIG. 10 is a plan view of one of the elements mounted in the casing portion shown in FIG. 9;

FIG. 11 is an elevational view taken along the line 11—11 of FIG. 10;

FIG. 12 is an elevational view taken along the line 12—12 of FIG. 10; and

Figure 1:
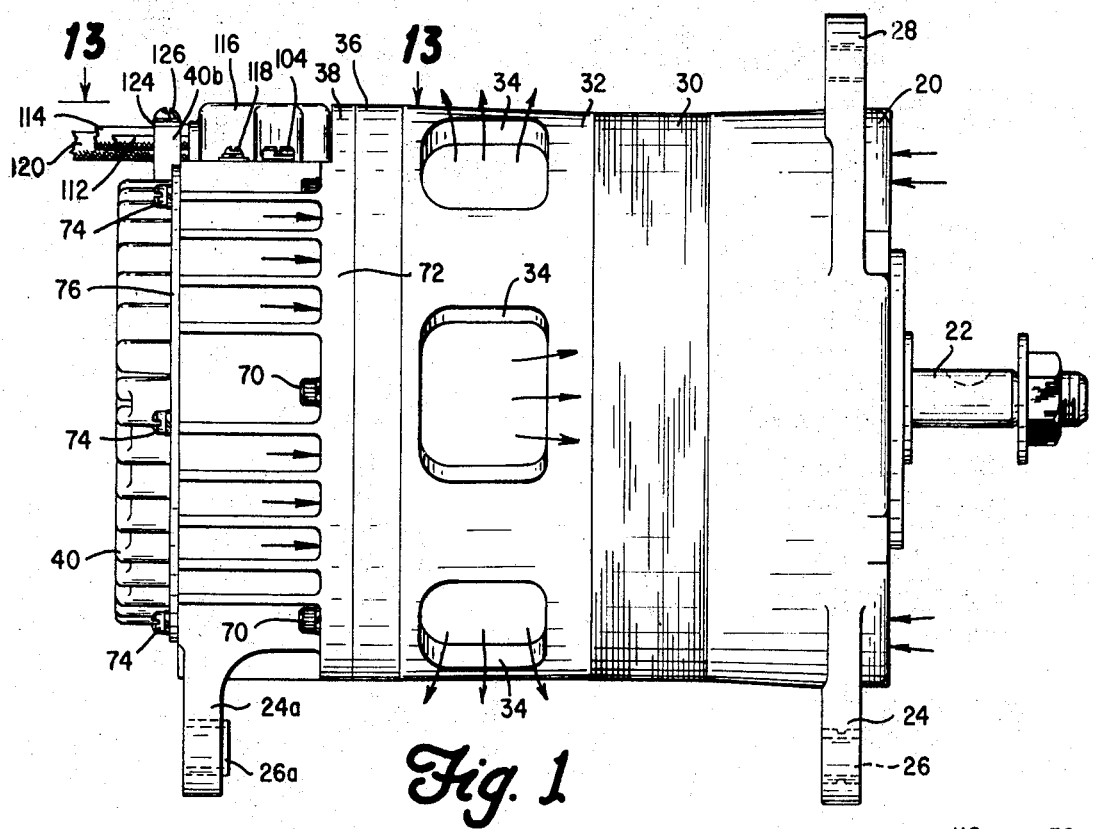
FIG. 1 is an elevational view of an alternator incorporating the invention.

Referring to the drawings, particularly to FIG. 1, an alternator is shown incorporating the invention comprising a drive end casing member 20 from which drive shaft 22 projects to cooperate with a driving pulley (not shown), whereby power is applied to the alternator as will be described further hereinafter. The casing member 20 is provided with a mounting ear 24 having a bearing bushing 26 cast therein which forms one of the elements whereby the alternator is affixed to an automotive vehicle or the like, for connection to the engine block. On the opposite side a second ear 28 is provided which cooperates with an adjustment means (not shown) whereby the alternator can be pivoted to adjust the driving shaft 22 relative to the engine of the automotive vehicle so that the driving belt (not shown) may be adjusted for tightness. The left side of the casing member 20 is provided with an annular flange 20a (FIG. 4) which is attached to and abuts against a laminated stator member 30 which carries three-phase power coils to magnetically cooperate with a Lundell type armature L mounted on the shaft 22 to create a magnetic relation therewith whereby a three-phase alternating current is generated as will be further described hereinafter.

The opposite side of the stator member 30 from the casing member 20, a tubular spacing element 32 is provided which is pierced by circumferentially-spaced ventilating apertures 34 for the purpose of allowing cooling air to flow through the elements of the alternator as will be further described hereinafter. The opposite side of the spacer member 32 cooperates with a fibrous tubular spacing element 36 which provides thermal insulation between the magnetic elements of the alternator positioned to the right thereof and the rectifier and control portions which are mounted in another casing element 38 positioned against the spacer member 36 to the left thereof as shown. The casing member 38 is provided with a mounting ear 24a which is positioned in aligned relation with the mounting ear 24 on the casing member 20 on the other end of the alternator as already described, so that a shaft passing through a second longitudinally-adjustable bushing 26a and the first bushing 26 will provide the pivotal relation for adjustably mounting the alternator on the engine block of an automotive vehicle. On the far left of the alternator, the closure cap 40 is provided which cooperates with the casing element 38 to provide a sealed enclosure in which the rectifying and control elements are mounted as will be described further hereinafter.

Referring again to FIG. 4, which shows a cross-sectional view of the alternator, it will be noted that the driving shaft 22 is journalled in a ball bearing 42 with two bearing sealing members 44 and 46 all positioned centrally in the casing member 20. The ball bearing element 42 is held in a counter bore 42a in the casing member 20 by a flanged ring 42b and sealed by an "O-ring" 42c. The ring 42b is held in position on the casing member 20 by screws 42d as shown. The inner race of the bearing element is held between shoulder 22a on the shaft and a flanged slinger ring 42e slipped on the shaft from its driving end. An "O-ring" 22d seals the slinger ring to the bearing inner race and to the shaft.

In the interior of the alternator casing, the shaft is provided with longitudinal serrations 47 to interlock with juxtaposed rotor elements 48 and 49, which are press-fitted onto the serrations to affix them to the driving shaft against the shoulder 22a with a mud and dust slinger 22b welded to rotor element 49. An annular field coil 50 is positioned in the bights of the two armature elements 48 and 49. This provides an armature of the well-known Lundell type construction having oppositely-projecting teeth 48a and 49a which cooperate together and with the stator member 30 to form the magnetic elements of the alternator.

Figure 8:
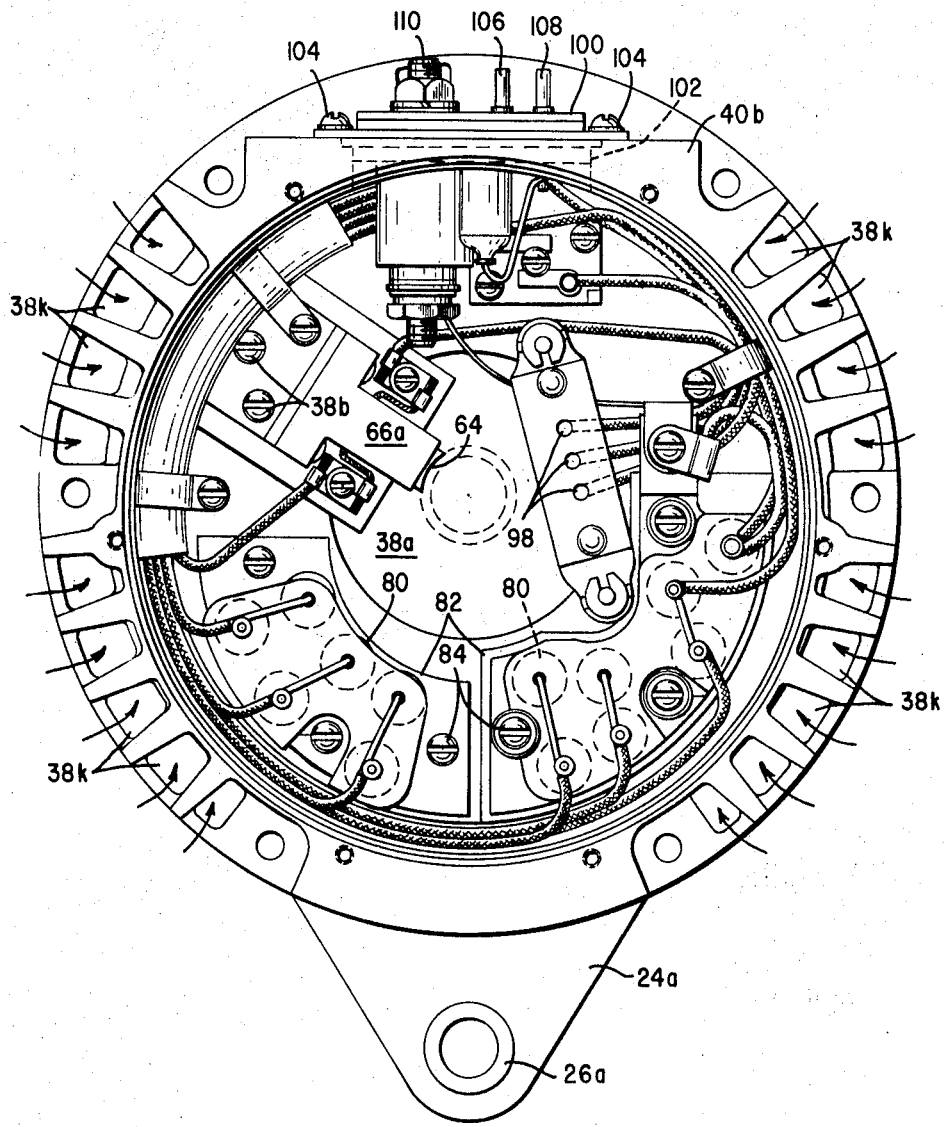
FIG. 8 is an elevational view taken from the left side of FIG. 5 showing the diodes and circuit elements mounted therein.

On the opposite side of the armature from the mud and dust slinger 22b, a bi-directional ventilating fan 52 is provided which is also press-fitted onto the serrated portion of the driving shaft so that a driving relation is provided by the serrated portion with both the Lundell type armature and the ventilating fan in either direction of rotation, which shall be described further hereinafter. Beyond the ventilating and cooling fan 52, the driving shaft 22 is necked down in two steps to a smaller diameter, the larger diameter forming a seat for a seal 54a, whose outer surface is seated in a counter bore of a bearing bushing 54' molded into a central tubular element 56 supported by spokes 56a to be an integral part of the housing portion 32. The bushing 54' seats a roller bearing 54 journalling driving shaft 22 on its smaller diameter of the necked portion. A second outer bearing seal 54b is also provided to seal the bearing to prevent ingress of brush dust. The bearing outer race is press-fitted into bushing 54', and the inner race thereof is press-fitted onto the shaft. The seal is held in position against a shoulder by a lock ring. The end of driving shaft 22 is provided with a further necked-down portion 22c on which are mounted in insulated relation, a pair of spaced slip rings 60 and 62 electrically connected to the field coil 50 mounted on the armature L which cooperate with brushes 64 and 66 supported in brushholder 66a affixed by screws 38b to the inner radial wall 38a of the chamber 58 formed in the casing element 38 (FIG. 8). The brushes are in electrical circuit with a power source to provide electrical energy to the rotating field coil 50 to excite the three-phase power coils 30a positioned in slots in the fixed stator member 30.

The housing or casing element 38 which forms in part the chamber 58 in cooperation with its cover 40, cooperates at its perimeter with the thermal insulation member 36 by an interlocking flange, and also cooperates internally with an outwardly-extending flange on the tubular member 56 which it embraces in a sealed relation to seal the chamber 58 at this point.

Casing elements 20, 30 and 34 are clamped together by through bolts 68 threaded through suitable bores and threaded into the element 32 as shown best in FIG. 4. On the opposite side of body element 32, housing portions 38 and 36 (thermal insulation) are clamped together by relatively short through bolts 70 through bores piercing flange 72 and threaded into the member 32 as best seen in FIGS. 1 and 2. The cover 40 is clamped against the housing member 38 by screws 74 piercing its outwardly-extending flange 76, also as best seen in FIGS. 1 and 2, threaded into the outer edge of the housing member 38. A perimetrical flange 40a projects into the chamber 58 and is provided with an "O-ring" seal with the inner wall of the chamber as shown in FIG. 4.

Chamber 58 has mounted within its space, rectifiers 80 which convert the three-phase alternating current generated in the stator coils 30a by the excitation of the direct-current excited field coil 50 mounted in the Lundell type armature L as has already been described. The rectifiers 80 are solid state in conformation and are well known in the art and need not be described in further detail. They may be connected as a full wave rectifier and will supply the direct-current power to excite the field coil 50, which during the initial phase of operation is excited with D.C. current from a battery (not shown) mounted on a vehicle on which the alternator is positioned as a power source. After the alternator is generating a predetermined voltage depending on the electrical system of the automative vehicle or the like on which it is positioned, it will assume the field excitation load as well as charging the battery. The rectifiers are mounted on suitable plates 82 which are attached by screws 84 to the wall 38a in a manner to convey the heat generated in the rectifiers to the housing member 38 where the heat is dissipated as will be described further hereinafter.

Also mounted in the chamber 58, which is sealed from atmospheric conditions as already described, is a static voltage regulator 90 fabricated from solid state components so that it may operate without any mechanical movement of any of the parts. The regulator is controlled by and responsive to the voltage rectified by the rectifiers 80 and regulates the direct-current exciting the field coil 50 on the rotating armature L so that the magnetic flux generated by the coil 50 is varied to maintain the voltage generated in the three-phase power coils in the stator within the predetermined limits. These static regulators are well known in the art and may vary considerably in their details of construction and therefore will not be described further.

Figure 9:
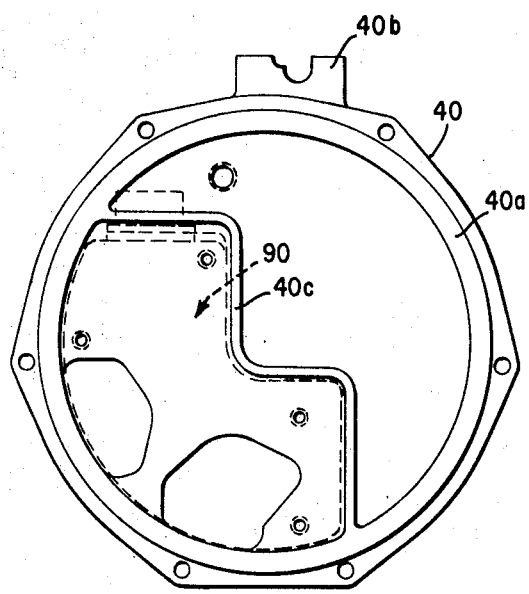
FIG. 9 is an elevational view of a casing element mounted on the alternator on its right end as shown in FIG. 1.

The components of the regulator 90 are preferably mounted on an insulating plate 92 which is affixed to a metal angle plate 94 acting as a heat sink. Three terminal prongs 96 are mounted transversally of the insulating plate 92 which cooperate with the female terminal elements 98 affixed in chamber 58 in the main body of the alternator (FIG. 8). The assembly shown in FIGS. 10–12, comprising the static regulator components, is affixed to the cover member 40 (FIG. 4) so that when the cover is in operative position on the main body of the alternator, terminal prongs 96 are in engagement with its female counterpart 98 to make the necessary electrical connections between all of the control elements to form a working device. The fact that the components of the static regulator which are rupturable or subject to damage for any reason so as to become inoperative are mounted on the cover 40, allows ready and prompt repair, by simply replacing the whole cover 40 with its components with a new and operable part. This facilitates repairs to the regulator in the service field. If desired, the assembly 90 shown in FIGS. 10–12 may be encapsulated after it is mounted on the cover 40 (FIG. 9) by first providing an upstanding flange 40c to provide a dike to hold the liquid resin in place during hardening for the encapsulating step. Any suitable resin may be used for this purpose.

Figure 13:
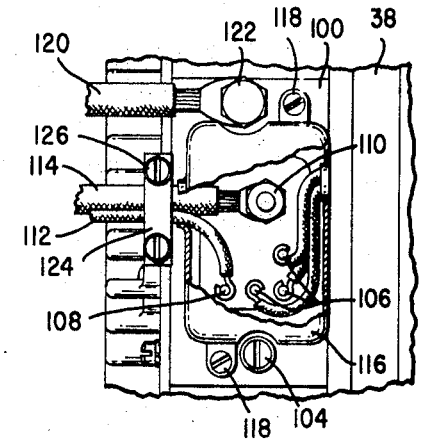
FIG. 13 is a plan view partly cut away of the terminal elements of the alternator taken along the line 13—13 of FIG. 1.

Referring now to FIGS. 4, 8 and 13, the casing element is provided with a terminal block 100 of insulating material mounted in sealed relation in an aperture 102 in the wall of the casing opposite the mounting ear 24a, being held in position by clamping screws 104. Five terminals are positioned in the block 100, including the three-phase terminals 106 which connect the three-phase power coils 30a with the rectifiers 80 and the controls in the sealed chamber 58, the ignition terminal 108 and the main direct-current power terminal 110. These terminals are sealed into the block 100 as they enter into the sealed chamber 58 in which the rectifying and control devices are positioned which must be protected from atmospheric conditions. The ignition terminal 108 is connected to a lead 112 while the power terminal 110 is connected to power lead 114, both the leads extend through an opening in a cover member 116 attached by screws 118 to the body of the alternator. A ground lead 120 is attached to the casing element 38 by a bolt 122 on the exterior of the cover member 116. The leads 114 and 112 are clamped to the body by bridge 124 attached by screws 126 to the cover 40, provided with an upward projection 40b for that purpose.

As is well known, the power rating of a dynamo-electric machine is closely related to its acceptable temperature rise for a given power output. The cooling of such a device is therefore of utmost importance and special attention to the air flow through the device for carrying away the heat generated must be given before the greatest power ouput can be generated. Novel arrangements have been made in the alternator described herein which provide efficient cooling of the parts to obtain maximum output from the machine without any part being subjected to destructive temperatures.

The bi-directional air circulating fan 52 positioned on the shaft 22 adjacent a central location of the alternator to be rotated thereby in either direction has already been described. The relation of the fan 52 to the alternator and its driving shaft 22 is best seen in FIG. 4, where the fan is mounted immediately below apertures 34 best seen in FIGS. 1 and 4. Two views of the fan are seen in FIGS. 6 and 7 which show the details of construction thereof, comprising a central cast member 130, with an integrally-cast hub spider 132 for reinforcing the central position where it is attached to the driving shaft 22. The cast member 130 has a central circular plate 136 on the opposite sides of which an odd number of radial embossments 138 are cast in the shape of an elongated rain drop to reduce noise. The embossments on the opposite sides of the central plate 130 are in staggered relation for additional noise reduction. For strength and to increase fan efficiency, the upper and lower sides of the embossments are machined to provide depressions 142 with undercuts into which ring plates 144 and 146 are interlocked by partial rotation of the ring plates relative to the embossments. The ring plates are then dimpled in three places 142a to prevent further relative rotation. This in effect gives the fan a double action for moving air outwardly in a radial direction with either direction of rotation through the passageways 140 on each side of the central plate 136, while pulling air inwardly at the central locations on each side of the central plate 136 parallel to the driving shaft 22. The outward flow of air moves out of the alternator through openings 34 in the housing or casing element 32 as best seen in FIGS. 1 and 4.

With the double action of the fan 52, cooling air is drawn into the alternator housing from each of its ends, through and over the operating parts of the alternator and then discharged outwardly adjacent a central location through the apertures 34 carrying with it the heat that has been absorbed from the alternator parts. On the drive end of the alternator, where the shaft 22 projects from the housing element 20, apertures 20a are provided (FIG. 3) into which fins 20b project radially to give greater radiation surface for transfer of heat to the cooling air moving into the alternator through the apertures 20a as shown by the arrows. The cooling air impinges upon the rotating armature L and passes through it via its openings to absorb heat from the adjacent radiating surfaces. After passing through the armature L, the air is expelled from the alternator casing by the fan 52 in the manner already described.

On the other end of the alternator, opposite from the drive end, the cooling air is drawn from the outer atmosphere into the alternator casing through apertures 38k in housing member 38 adjacent its outer perimeter as best seen in FIGS. 1, 2 and 8. The longitudinal movement of air into apertures 48k also causes substantial air movement over radial fins 40k positioned on the end face of the cover 40 as best seen in FIG. 2. After the cooling air has entered the alternator casing, it flows over the heated inner parts absorbing heat and finally to pass into the central region of the fan opposite from that of the air flowing through the alternator from the drive end. Once it passes into the fan 52, it is driven outwardly as before to pass out to the atmosphere through casing apertures 34.

The movement of air from either end of the alternator occurs irrespective of the direction of rotation of the armature with substantially equal efficiency, due to the rain drop design of the propelling fins of the fan 52. At the same time, this design of the fins also reduces the noise arising from the air movement through the alternator to a minimum, irrespective of the direction of rotation of the armature.

It is to be understood that the above detailed description of the present invention is intended to disclose an embodiment thereof to those skilled in the art, but that the invention is not to be construed as limited in its application to the details of construction and arrangement of parts illustrated in the accompanying drawing since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed is:

1. An alternator, comprising in combination a stator element carrying power windings, a rotor mounted in said stator element adapted to rotate relative thereto, having a field coil to create a magnetic field to excite the power windings, casing elements cooperating with the stator element and the rotor to provide a journal means for the rotor, seal means provided for the journal means, a pair of slip rings carried by the rotor connected to the opposite ends of the field coil, a pair of brushes supported by casing elements in engagement with the slip rings, a sealed chamber in said casing elements housing said slip rings and brushes, a full wave rectifier mounted on a wall portion of one of the casing elements in said sealed chamber in electrical circuit with said power windings to rectify A.C. to D.C. current for the power output, a second removable wall portion of the sealed chamber in said casing elements, a solid state regulator positioned in said second removable wall portion of the sealed chamber, responsive to variations in said D.C. power output to control the current in the field coil in the rotor to maintain the output of the alternator within predetermined limits, means to draw cooling fluid through the casing elements and over the sealed chamber, and means in the sealed chamber to interconnect the various rectifying and regulating devices for the alternator.

2. The alternator defined in claim 1 further characterized by a fan mounted on the rotor adjacent a central location of the alternator whereby cooling air is drawn in from each end of the alternator and ejected from the alternator radially outwardly by the fan.

3. The alternator defined in claim 2 further characterized by providing a fan which has pairs of elements shaped as elongated rain drops positioned in generally radial positions to move the air outwardly with minimum noise.

4. The alternator defined in claim 3 further characterized by having the pairs of air-moving elements mounted on three parallel plates attached together to a central hub.

5. An alternator, comprising in combination a stator element carrying power windings, a rotor mounted in said stator element adapted to rotate relative thereto, having a field coil to create a magnetic field to excite the power windings, interfitting casing elements cooperating with the stator element having openings for air circulation, a journal means for the rotor on the casing elements, a bi-directional fan on the rotor to move cooling air through said openings, a pair of slip rings carried by the rotor connected to the opposite ends of the field coil, a pair of brushes supported by casing elements in engagement with the slip rings, a sealed chamber with cooperating wall portions in said casing elements housing said slip rings and brushes, a full wave rectifier mounted on a first fixed wall portion in said sealed chamber in electrical circuit with said power windings to rectify A.C. to D.C. current for the power output, a second removable wall portion in said sealed chamber in said casings elements, a solid state regulator positioned on said removable wall portion, responsive to variations in said D.C. power output to control the current in the field coil in the rotor to maintain the output of the alternator within predetermined limits, and means in the sealed chamber to interconnect the various rectifying and regulating devices for the alternator.

6. The alternator defined in claim 5 further characterized by providing thermal insulation in one of the casing elements to stop the flow of heat from the stator element to the casing elements forming the sealed chamber in which the rectifying and control elements are positioned.

7. The alternator defined in claim 6, whereby the thermal insulation is provided by a ring of plastic material positioned between two cooperating casing elements.

References Cited

UNITED STATES PATENTS

| | | | |
|---|---|---|---|
| 3,041,484 | 6/1962 | Freer | 310—68 |
| 3,250,928 | 5/1966 | Bates | 310—68 |
| 3,271,601 | 9/1966 | Raver | 310—58 |
| 3,295,046 | 12/1966 | Margaira | 310—68 |
| 3,311,764 | 3/1967 | Linkous | 310—68 |
| 3,329,840 | 7/1967 | Binder | 310—68 |
| 3,329,841 | 7/1967 | Binder | 310—68 |
| 3,361,915 | 1/1968 | Baker | 310—68 |
| 3,378,708 | 4/1968 | Baker | 310—68 |

MILTON O. HIRSHFIELD, Primary Examiner

R. SKUDY, Assistant Examiner

U.S. Cl. X.R.

310—58, 168